United States Patent [19]

Shao

[11] Patent Number: 5,664,411
[45] Date of Patent: Sep. 9, 1997

[54] S CYCLE ELECTRIC POWER SYSTEM

[76] Inventor: Yulin Shao, 35 Lincoln St., Stoneham, Mass. 02180

[21] Appl. No.: 704,123

[22] Filed: Aug. 28, 1996

Related U.S. Application Data

[62] Division of Ser. No. 420,405, Apr. 12, 1995, Pat. No. 5,572,861.

[51] Int. Cl.$^6$ ............................................. F02C 3/28
[52] U.S. Cl. .................................. 60/39.02; 60/39.12
[58] Field of Search ............................ 60/39.02, 39.07, 60/39.12, 39.181, 39.182, 39.52

[56] References Cited

U.S. PATENT DOCUMENTS

| | | |
|---|---|---|
| 4,150,953 | 4/1979 | Woodmansee . |
| 4,193,259 | 3/1980 | Muenger et al. . |
| 4,475,347 | 10/1984 | Hegarty et al. . |
| 4,667,467 | 5/1987 | Archer et al. . |
| 4,689,949 | 9/1987 | Kashiwazaki et al. . |
| 4,785,621 | 11/1988 | Alderson et al. . |
| 4,785,622 | 11/1988 | Plumley et al. . |
| 4,852,996 | 8/1989 | Knop et al. . |
| 4,942,734 | 7/1990 | Markbreiter et al. . |
| 5,197,277 | 3/1993 | Ishigami et al. . |
| 5,212,941 | 5/1993 | Croonenbrock et al. . |
| 5,218,815 | 6/1993 | Korenberg . |
| 5,265,410 | 11/1993 | Hisatome . |

*Primary Examiner*—Louis J. Casaregola
*Attorney, Agent, or Firm*—Samuels, Gauthier, Stevens & Reppert

[57] ABSTRACT

A method for generating electric power comprises the S cycle, an air separation unit and a Rankine cycle. Steam, oxygen and coal are introduced into a reaction chamber to form fuel gas. The fuel gas flows through heat exchangers and a compressor-turbine group to three combustors. Three combustors are operated at different pressure levels. The combustion gases of the first combustor go to the first gas turbine. The exhaust of the first gas turbine is employed as working medium for the succeeding combustors and gas turbines. The combustion gases of the second combustor flow to the second gas turbine, and the combustion gases of the third combustor go to the third gas turbine. The exhaust of the third gas turbine is utilized to heat compressed air and to produce steam for coal gasification and Rankine cycle. An integrated air separation unit, including a pressure temperature swing process, produces pure oxygen on site and generates electricity through a turbine compressor group.

2 Claims, 4 Drawing Sheets

S CYCLE ELECTRIC POWER SYSTEM

This is a divisional of application Ser. No. 08/420,405 U.S. Pat. No. 5,572,861, filed on Apr. 12, 1995.

BACKGROUND AND BRIEF SUMMARY OF THE INVENTION

Coal is the world's most plentiful fuel and the United States has an abundant supply. Currently, 86% of coal consumption of the United States goes to generating electricity and about 55% of electricity generated is produced from coal. Most of the coal presently being consumed is by direct combustion of finely pulverized coal in large-scale utility furnaces for the generation of electric power. In the last two decades, an Integrated Coal Gasification Combined Cycle (IGCC) has been developed to produce electric power. IGCC consists of coal gasification, Brayton cycle and Rankine cycle. A gas turbine is operated in a Brayton cycle mode while a steam turbine works in a Rankine cycle. Exhaust of the gas turbine is used to generate steam for the steam turbine. Energy efficiency of IGCC is in a range of 40–47%.

Coal fired power industries, along with other fossil fired power plants, generate significant pollutant emissions including nitrogen oxides ($NO_x$) sulfur oxides ($SO_x$) and carbon dioxide ($CO_2$). Sulfur oxides and nitrogen oxides can be controlled to some extent by emission devices at considerable cost. However, removal of power plant $CO_2$ emission requires significant amounts of energy leading to a 30–40% reduction of energy efficiency. However, the removal and sequestering of power plant $CO_2$ emission is a definite goal of international community, as $CO_2$ is a major contributor to global warming effect.

The present invention broadly embodies an S Cycle Electric Power System (SCEPS) with high energy efficiency and zero pollutant emissions including $CO_2$. In SCEPS coal is gasified, and burned in the S cycle. Sulfur and other pollutants are removed before combustion. Combustion gases basically consist of $CO_2$ and water vapor, and are used to generate power in three free turbines. Most of the exhaust of the third turbine is used to heat the recycled $CO_2$ and $O_2$, and to generate steam for coal gasification. The rest of the exhaust is utilized to produce steam for a steam turbine system. The energy efficiency of SCEPS is higher than the IGCC, e.g. 49–51%. When a $CO_2$ removal unit is not included in SCEPS, the energy efficiency increases significantly, e.g. 59–61%, leading to a reduction of $CO_2$ emission in terms of kg $CO_2$/kWh. SCEPS can also burn natural gas instead of the synthetic gas produced from coal gasification.

DESCRIPTION OF THE PREFERRED EMBODIMENT(S)

Process of SCEPS I

An S Cycle electric Power System (SCEPS I) of the invention comprises coal gasification, the S cycle, steam turbine(s), and a separation and condensation unit.

Figure 1:
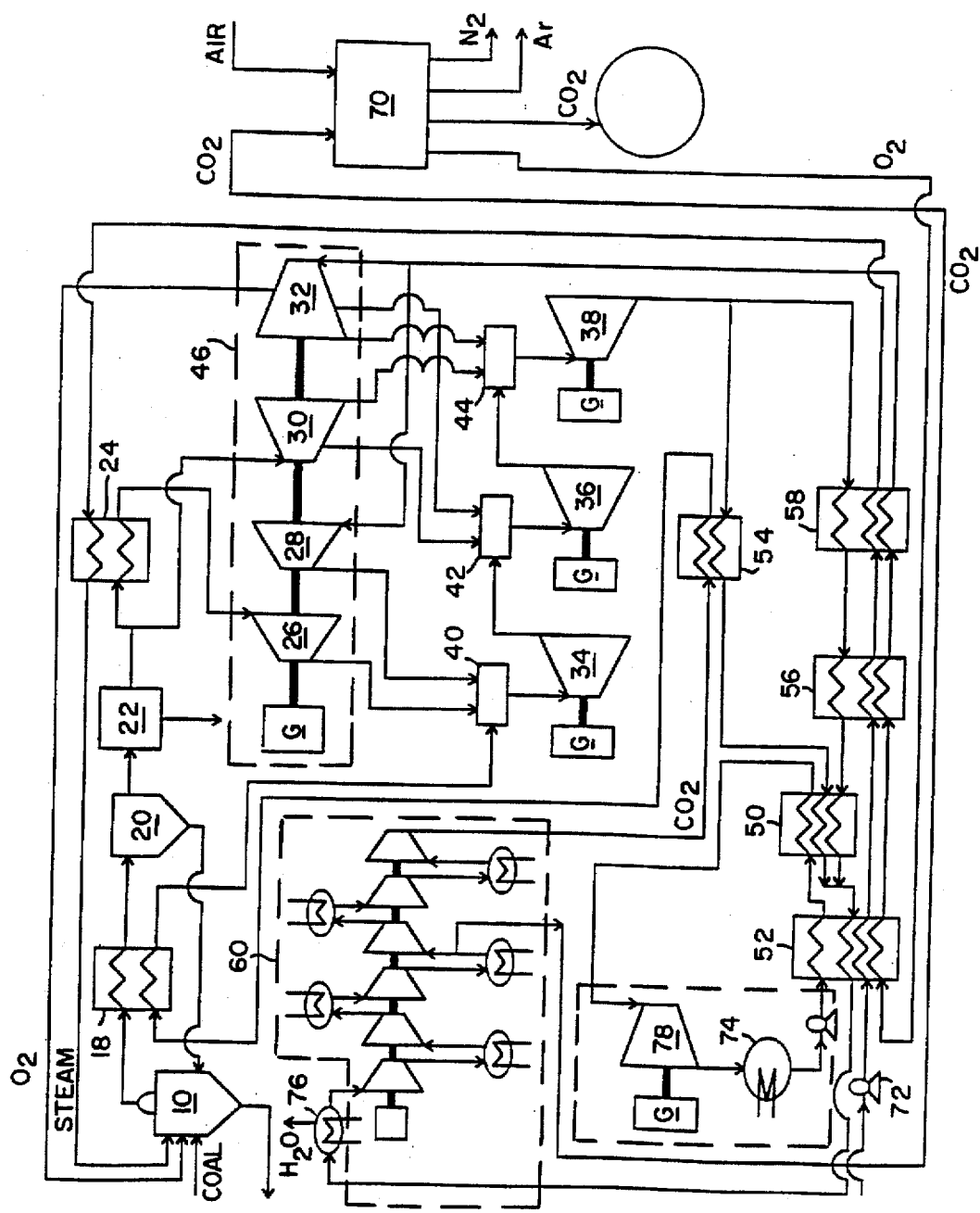
FIG. 1 is a process flow diagram of a system embodying the invention.

Referring to FIG. 1, pulverized coal, $O_2$ and steam are all introduced into a coal gasifier 10. In the coal gasifier 10, the coal, $O_2$ and the steam are converted into fuel gas (synthetic gas or raw gas) through well known chemical reactions. The pressure and temperature of the coal gasifier 10 are about 30 bar and 2,000 K, respectively. The temperature of the produced fuel gas is around 1,800 K. The low heating value (LHV) of fuel gas is in a range of 7–12 MJ/kg. The hot fuel gas from the coal gasifier 10 first heats recycled $CO_2$ in a heat exchanger 18 and then flows to a cyclone 20 where fly ash is separated from the fuel gas. The separated fly ash from the cyclone is returned to the coal gasifier 10 for further gasification. The effluent fuel gas from the cyclone 20 flows to a high temperature fuel gas cleaning unit 22 where $H_2S$ and COS are removed from the fuel gas. The cleaned fuel gas is then split into two streams.

One stream of the fuel gas flows through a heat exchanger 24 and is used to heat steam flowing through the heat exchanger 24. The temperature of the steam flowing through the heat exchanger 24 increases from 600 K to about 1000 K. This steam at 1000 K flows to the coal gasifier 10. The one cooled stream of fuel gas then flows to a compressor 26. The other stream of fuel gas flows directly to a turbine 30 at temperature of 1,150 K.

The S Cycle

The S cycle (system) comprises three main turbines 34, 36 and 38; three combustors 40, 42 and 44; a compressor/turbine group (CTG) 46, several heat exchangers 50, 52, 54, 56 and 58 and a 6-stage. $CO_2$ compressor assembly with inter-stage cooling shown generally at 60. The three turbines 34, 36 and 38 are operated at three pressure levels, 64 atm, 16 atm and 4 atm respectively.

The stream of fuel gas from the heat exchanger 24 is compressed by the compressor 26. The pressure increases from 30 atm to 64 atm and the temperature increases from 650 K to 1,100 K. This fuel gas then flows from the compressor 26 to the combustor 40 where it is burned in a mixture of $O_2/CO_2$ to form a combustion gas. The $CO_2$ is used as a diluting fluid to control the temperature of combustion gas. This combustion gas flows to the turbine 34 where it expands to generate power. The exhaust from turbine 34 flows to the combustor 42 where it functions as a diluting fluid.

The other stream of fuel gas flows from the fuel gas cleaning unit 22 to the turbine 30 and expands through the turbine 30 to lower pressure and to recover some exergy. A portion of the fuel gas is extracted at the middle stages of the turbine 30 and flows to and is combusted in the combustor 42 along with a stream of $O_2$ from the turbine 32. The combustion gas of the combustor 42 is used to produce power in the gas turbine 36. The rest of the fuel gas further expands to 4 atm in the turbine 32 and flows to the combustor 44 along with a stream of $O_2$. In the combustor 44 the diluting fluid is the exhaust of the turbine 36. The hot combustion gas of the combustor 44 is utilized to generate power in the gas turbine 38. Temperatures of the combustion gases of all three combustors, 40, 42 and 44 are maintained at about 1,400 K by supplying diluting fluid, primarily $CO_2$. Most gas turbine materials can withstand temperatures up to 1,400–1,500 K. The exhaust of the turbine 34 flows directly to the combustor 42 as its working fluid and that of the turbine 36 to the combustor 44. This design efficiently utilizes the thermal energy of the exhausts of the turbines 34 and 36.

A stream of $O_2$ at 49 atm and 300 K is produced in a separation and condensation unit 70 and is heated to 600 K in heat exchangers 52, 56 and 58. Then the heated $O_2$ from the heat exchanger 58 splits into two streams. One stream flows to the compressor 28 and is compressed to 64 atm and then flows to the combustor 42.

The other stream flows to and expands through the turbine 32. A stream of $O_2$ is extracted from middle stages of the turbine 32 at about 30 atm and 495 K and flows to the coal gasificator 10. A stream of $O_2$ is extracted from the turbine 32 at about 16 atm and 450 K, and flows to the combustor 44. The rest of $O_2$ in the turbine 32 further expands to 4 atm and then flows to the combustor 44.

An exhaust flue gas, mainly $CO_2/H_2O$, flows from the turbine 38, and splits into two streams. One stream of flue gas flows to the heat exchanger 58 to generate steam for the coal gasifier 10 and to the heat $O_2$ discharged from the separation and condensation unit.

The other stream of the flue gas flows through the heat exchanger 54 to heat recycled $CO_2$. The flue gas from the heat exchanger 54 flows through the heat exchanger 50 to generate low pressure superheated steam together with flue gas from the heat exchanger 56. In the heat exchanger 56 water and $O_2$ from heat exchanger 52 are heated. The flue gases discharged from the heat exchanger 50 are recombined and flow through the heat exchanger 52. Water from a pump 72 at 30 atm flows through heat exchanger 52. This water, $O_2$ from the separation and condensation unit 70 and the condensate from a condenser 74 are all heated by the flue gas flowing through the heat exchanger 52.

The flue gas from the heat exchanger 52 is cooled to 320 K in a cooler 76 where the $H_2O$ of the flue gas is condensed and removed. The effluent of the flue gas from the cooler 76 is basically $CO_2$ and is compressed by the 6-stage $CO_2$ compressor assembly 60. At the third stage a portion of the $CO_2$ is extracted and flows to the separation and condensation unit 70 for liquification and sequestering. The rest of $CO_2$ is further compressed to 64 atm, heated in the heat exchangers 54 and 18 and finally recycled back to the combustor 40 where it functions as diluting fluid.

Advantages of the S cycle include (a) efficiently utilizing the thermal energy of the exhausts of the turbine 34 and 36 which results in a high overall efficiency; (b) reducing the compression work of the $CO_2$ compressor by making $O_2$ bypass the $CO_2$ compressor, this reduction of mass flow will save a portion of the compression work; (c) lowering the compression work of $O_2$ by using a process of compressing liquid $O_2$ followed by evaporating and heating $O_2$, because compression of liquid $O_2$ requires much less work than the compression of gaseous $O_2$; (d) recovering part of the exergy of $O_2$ by expanding high pressure 02 through the turbine 32 of the CTG 46, (e) lowering the compression work of the $CO_2$ compressor by using inter-stage cooling; (f) reducing the fuel consumption used for heating the $CO_2$ in the combustor by using the thermal energy of the exhaust of the turbine 38 instead of chemical energy (that is fuel).

The Steam Turbine

In addition to the power generated by the S cycle, a Rankine cycle contributes about 1–5% of total output power of the SCEPS. The thermal energy, the combined flue gas streams from the heat exchangers 54 and 56 is used to generate the Superheated steam in the heat exchanger 50. The superheated steam of 2 atm and 450 K expands through the steam turbine 78 to produce power. The exhaust pressure and temperature of the steam turbine 78 are 0.1 atm and 330 K, respectively. The exhausted steam is condensed in the condenser 74, is pumped to 2 atm and flows through the heat exchanger 52. In the heat exchanger 52, the condensate is heated to its saturated state. This saturated water is further heated in heat exchanger 50 to complete the Rankine cycle.

Separation and Condensation Unit

Figure 2:
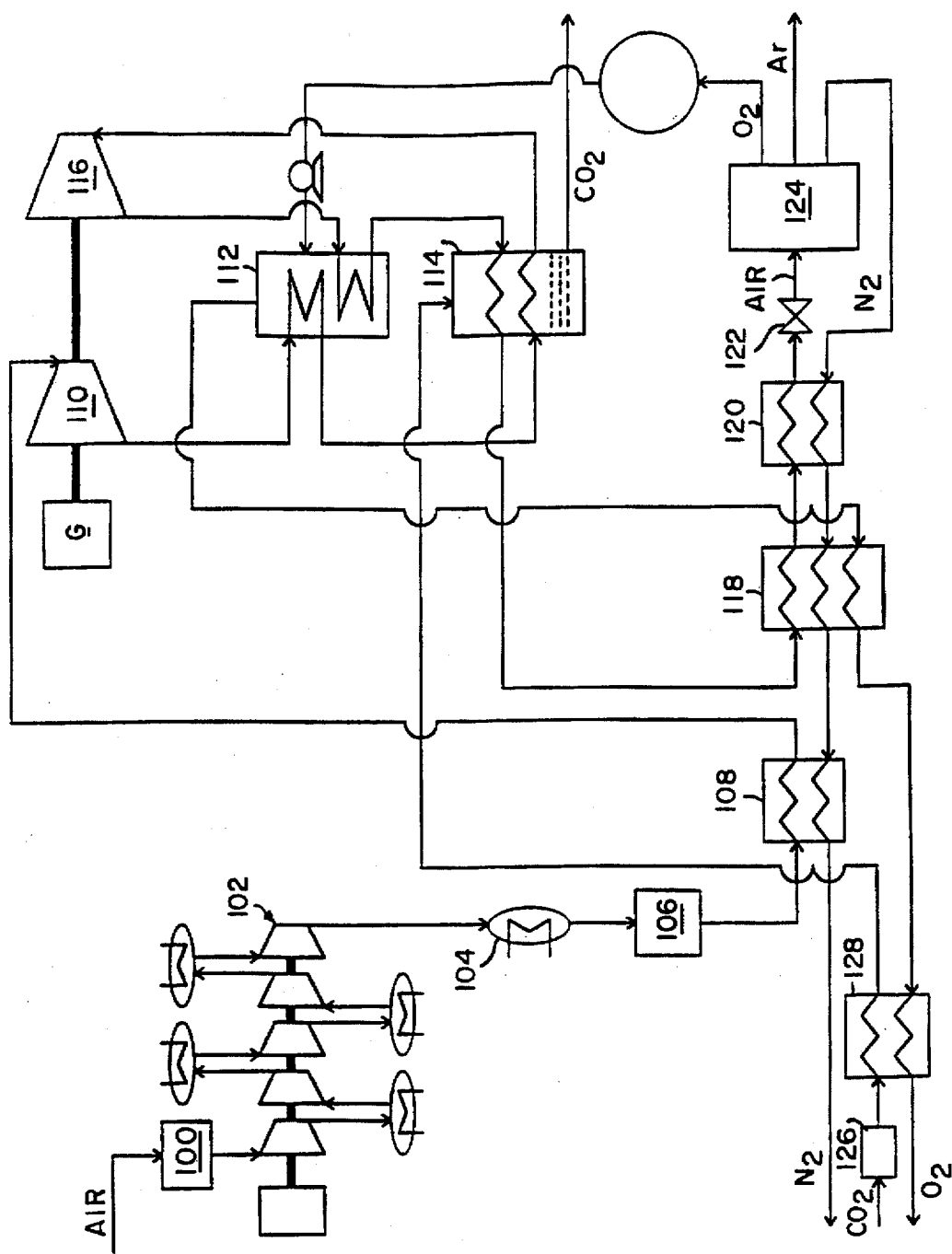
FIG. 2 is a process flow diagram of the separation.

Referring to FIG. 2, the air separation and condensation unit 70 is shown in greater detail.

Ambient air first passes through a dust filter 100 and then is compressed to a high pressure by a 5-stage air compressor with inter-stage cooling 102. The discharged air is cooled to 320 K by water in a cooler 104. $CO_2$ and water vapor in the compressed air are removed in an air drying unit 106. The dried air is chilled in a heat exchanger 108 by cold $N_2$ flowing through the heat exchanger 108 and the chilled dried air expands through an air turbine 110 to lower the temperature and to recover some exergy. The air exhausted from the turbine 110 is further cooled to about 170 K in an evaporator 112. This further cooled air flows to a $CO_2$ condenser 114 where it is used to liquefy gaseous $CO_2$. After leaving the condenser 114, the air expands to 7–8 atm through an air turbine 116. The temperature of the air is reduced from 225 K to about 185 K. The air exhausted from the turbine 116 is chilled again in the evaporator 112 and then flows to the condenser 114 to liquefy $CO_2$. After leaving the condenser 114, the air is cooled to 165 K in a heat exchanger 118 by cold $O_2$ from the evaporator 112 and cold $N_2$ from a heat exchanger 120. The air is further cooled to 110 K in the heat exchanger 120 by cold $N_2$ alone. The cold air discharged from the heat exchanger 120 expands through an expansion valve 122 and flows to an air separation unit 124. The temperature and pressure of the air entering the unit 124 are 103–104 K and 5–6 atm, respectively. In the unit 124 the air is separated into liquid $O_2$, pure argon (Ar) and $N_2$. The separated liquid $O_2$ is stored in a tank 126 for later use. The liquid $O_2$ is pumped to 49 atm and then flows into the evaporator 112 to refrigerate the compressed air from the turbines 110 and 116.

Compressed $CO_2$ from the S cycle (FIG. 1) first flows through a drier 126 where water vapor in the $CO_2$ is removed to avoiding water icing during liquefaction of $CO_2$. The dry $CO_2$ gas is then cooled to 235 K in heat exchanger 128 by cold $O_2$ and then sent to the condenser 114. In the condenser 114, the gaseous $CO_2$ is liquefied by the cold air streams. The condensed liquid $CO_2$ may be sold as a by product or sequestered, for example, in depleted oil and gas reservoirs, or in the deep ocean.

Advantages of SCU include (a) saving part of the power used for liquefying the gaseous $CO_2$; (b) allowing the SCEPS use offpeak power to produce $O_2$. At peak hours all of the power generated by the SCEPS is delivered to the electric grid; (c) avoiding $CO_2$ icing during $CO_2$ liquification process.

process of SCEPS II

Figure 3:
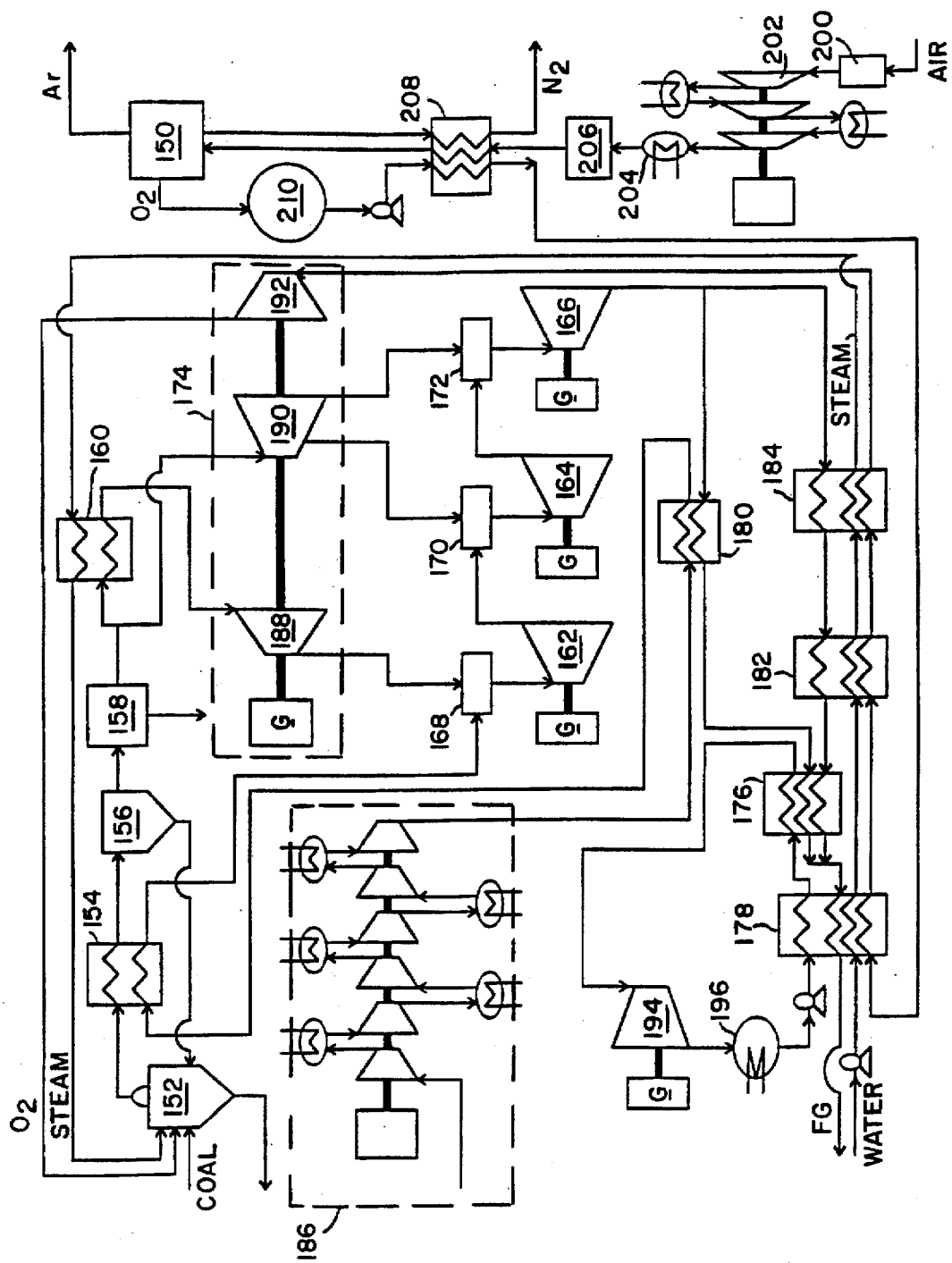
FIG. 3 is a process flow diagram of an alternative embodiment of the invention.

When $CO_2$ removal is not required, the separation and condensation unit 70 is replaced by an air separation unit (ASU). The S Cycle Electric Power System of FIGS. 1 and 2 is simplified to the S Cycle Electric Power System II (SCEPS II). The SCEPS II embodiment consists of coal gasification, the S cycle, steam turbine, and the air separation unit. FIG. 3 illustrates the detailed schematic of the SCEPS II.

Pulverized coal, $O_2$ and steam are introduced into a coal gasifier 152. In the coal gasifier 152, the coal, $O_2$ and the steam are converted into fuel gas (synthetic gas or raw gas) through well known chemical reactions. The pressure and temperature in the gasifier are about 30 atm and 2,000 K, respectively. The temperature of the produced fuel gas is around 1,800 K. The hot fuel gas from the gasifier 152 is first used to heat compressed air in a heat exchanger 154 and then flows to a cyclone 156 where fly ash in the fuel gas is removed. The separated fly ash is returned to the coal gasifier 152 for further gasification. In a high temperature fuel gas cleaning unit 158 where $H_2S$ and COS are removed from the fuel gas. The cleaned fuel gas is then split into two streams.

One stream of the fuel gas flows through a heat exchanger 160 and is used to heat steam flowing through the heat exchanger 160. This one stream then flows from the heat exchanger 160 to the S cycle at a temperature of 650 K. The other stream of fuel gas is directly sent to the S cycle at temperature of 1,150 K.

The S cycle of the SCEPS II process (system) comprises three main turbines 162, 164 and 166, three combustors 168, 170 and 172, a compressor/turbine group 174, several heat exchangers 176, 178, 180, 182 and 184 and a 6-stage air compressor assembly 186 with inter-stage cooling.

Ambient air is compressed to 64 atm by the assembly 186. The compressed air is heated to about 1,100 K in the heat exchangers 180 and 154 and then sent to the combustor 168. The fuel gas from the heat exchanger 160 is compressed to 64 atm by a compressor 188 and then burned in the combustor 168 along with the compressed air from the heat exchanger 154. The work required to compress the fuel gas in compressor 188 is provided by turbines 190 and 192. The combustion gas expands through the gas turbine 162 to generate power.

The fuel gas from the Coal gasification unit 152 via the unit 158 expands in the turbine 190 to lower pressure and to recover some exergy. At the middle stages of the turbine 190, some fuel gas is extracted at a pressure of 16 atm and flows to the combustor 170. The rest of fuel gas further expands to 4 atm and flows to the combustor 172.

The exhaust of the turbine 162 has about 17–18% $O_2$, and flows to combustor 170 where the flue gas exhausted from turbine 190 is combusted. The combustion products of the combustor 170 are used to produce power in the gas turbine 164. In the combustor 172, fuel gas is burned with the exhaust of turbine 164 which exhaust contains about 12–13% $O_2$. The hot gas from the combustor 172 is utilized to generate power in turbine 166.

The three main turbines, 162, 164 and 166 are operated at 64 atm, 16 atm and 4 atm, respectively. The exhaust of turbine 162 directly flows to the combustor 170 as its working fluid, and that of the turbine 164 flows to the combustor 172. The temperatures of the combustion gases of all three combustors 168, 170 and 172 are maintained at about 1,400 K. The exhaust temperatures of three main turbines 162, 164 and 70 are in a range of 1,060–1,020 K.

The flue gas exhaust from the turbine 166 is split into two streams. One stream flows through the heat exchanger 184 to generate steam and heat $O_2$ for coal gasification. The heated $O_2$ from the heat exchanger 184 expands through the turbine 192 to lower pressure and to recover some exergy and is then sent to the coal gasifier 152.

In the heat exchanger 180 the other stream of flue gas from the turbine 160 is used to heat the compressed air. The flue gas from the heat exchanger 180 flows through the heat exchanger 176 together with the flue gas from the heat exchanger 182, to generate low pressure superheated steam. The flue gas from heat exchanger 184 flows through the heat exchanger 182. In the heat exchanger 182, water and $O_2$ are heated by the flue gas. The flue gas from heat exchanger 176 are recombined and flow through heat exchanger 178. Water is pumped to 30 atm and flows through the heat exchanger 178. In the heat exchanger 178, the water, the $O_2$ and the condensate are heated by the flue gas. The flue gas is finally released to the atmosphere.

Steam Turbine

The thermal energy of the flue gas is used to generate superheated steam in the heat exchanger 176. Superheated steam of 2 atm and 450 K expands through a steam turbine 194 to produce power. The exhaust pressure and temperature of the steam turbine 194 are 0.1 atm and 330 K, respectively. The exhausted steam is condensed in a condenser 194, and pumped to 2 atm. In the heat exchanger 178, the condensate is heated to its saturated state. The saturated water is further heated in the heat exchanger 176.

Air Separation Unit

Ambient air first passes through a dust filter 200, then is compressed to 9 atm by a three-stage compressor 202 with inter-stage cooling. In a cooler 204 the discharged air is cooled to 320 K. A drier 206 removes the water vapor and $CO_2$ from the compressed air to avoid icing in the succeeding processes. The dried air is cooled by liquid $O_2$ and cold $N_2$ in the heat exchanger 208 and sent to the air separation Unit 150. In the air separation unit 150 air is separated into liquid $O_2$, pure $N_2$ and Ar. The liquid $O_2$ is stored in a tank 210 for later use. Argon is produced as a byproduct. $N_2$ is either released to the atmosphere or sold as a byproduct. The liquid $O_2$ from the $O_2$ tank is pumped to 49 atm. In the heat exchanger 208, the compressed air is cooled while $O_2$ is evaporated. The $O_2$ is further heated in heat exchangers 178, 182 and 184 before being sent to the turbine 192. The $O_2$ leaves the turbine 192 and flows to the coal gasifier 152.

Process of SCEPS III

Figure 4:
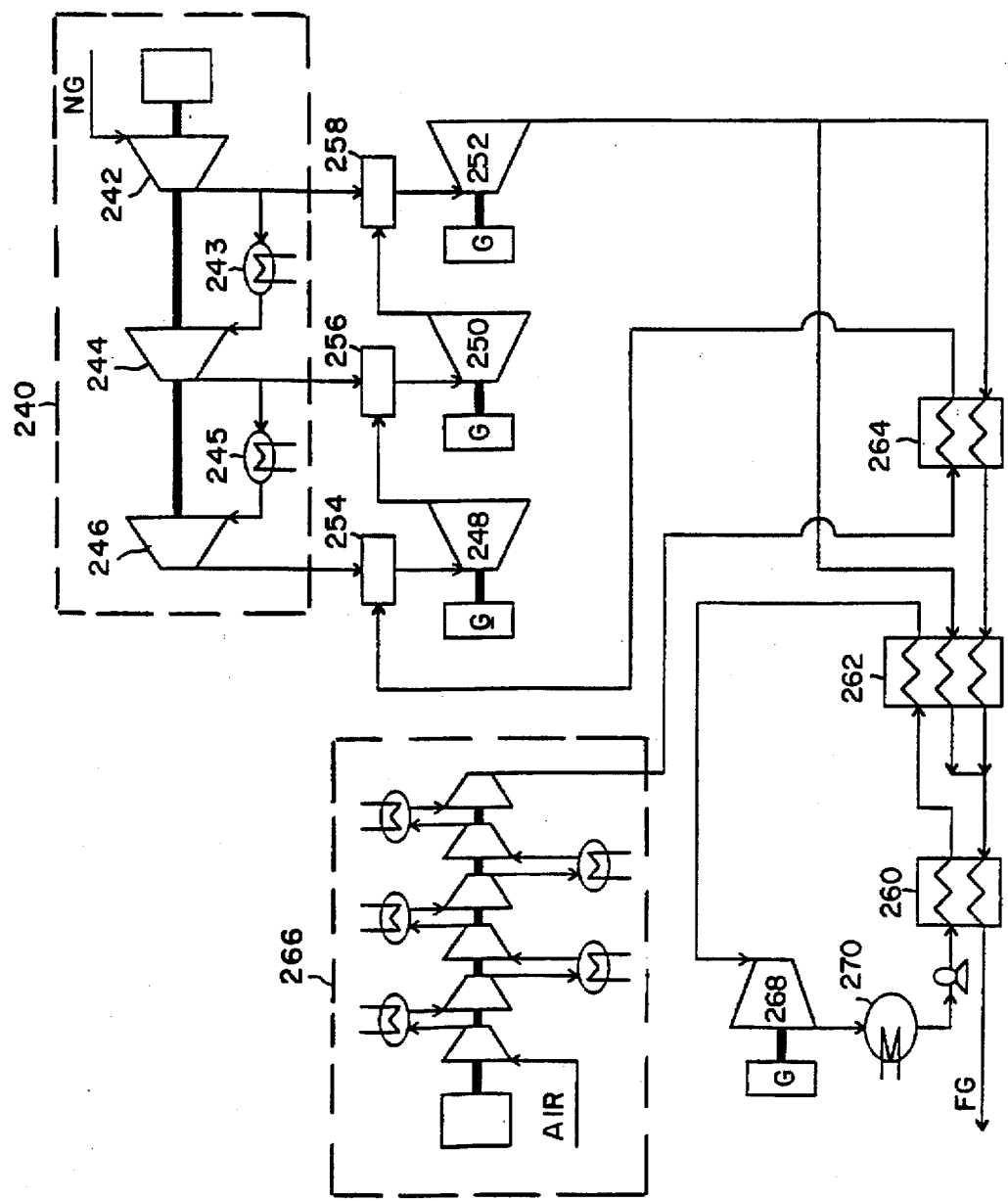
FIG. 4 is a process flow diagram of a further alternative embodiment of the invention.

When the S Cycle Electric Power System fires natural gas (NG) or other fuel gases instead of synthetic gas generated from coal gasification, the system becomes the SCEPS III (the S Cycle Electric Power System III). FIG. 4 shows the detailed schematic of the SCEPS III.

The S cycle of the SCEPS III comprises a 3-stage, natural gas compressor 240 with three compressors 242, 244 and 246 with inter-stage cooling; three main gas turbines 248, 250 and 252; three combustors 254, 256 and 258; three heat exchangers 260, 262, 264; a 6-stage air compressor with inter-stage cooling 266; a steam turbine 268 and a condenser 270. The supplied NG is compressed to 4 atm in the first stage of compressor 242. The exhaust is then split into two streams, one stream flows to combustor 258 and the other stream flows through a cooler 242 and is further compressed to 16 atm in compressor 244. The exhaust of compressor 244 also splits into two streams, one stream flows to combustor 256 and the other stream flows through cooler 245 and then is compressed again in the compressor 246.

The natural gas at 64 atm and 490 K is fired in the combustor 254 along with the air from the heat exchanger 264. Before being sent to the combustor 254, the ambient air is first compressed to 64 atm by the 6-stage air compressor 266 then heated from 400 K to 1,100 K in the heat exchanger 264. The combustion products of the combustor 254 are used to generate power in the gas turbine 248. The exhaust of the gas turbine 248 flows to the combustor 256 where natural gas from compressor 244 is burned. The hot combustion gas produced in combustor 256 expands through the gas turbine 250 to drive a generator for electric power generation. In the combustor 258 the natural gas from the compressor 242 is combusted in the exhaust of the turbine 250 and produces combustion gas which is used to produce power in the gas turbine 252.

The three gas turbines 248, 250 and 252 are operated at 64 atm, 16 atm and 4 atm, respectively. The exhaust of the turbine 248 flows directly to the combustor 256 as its working fluid, and that of the turbine 250 to the combustor 258. Temperatures of combustion gases of three combustors are maintained at about 1,400K. Exhaust temperatures of three gas turbines are in a range of 1,060–1,040 K. The exhaust of the turbine 252 splits into two streams. One stream of flue gas flows through the heat exchanger 264 to heat the compressed air. The other stream of flue gas is used to generate steam.

To enhance the overall energy efficiency of the SCEPS III, thermal energy of flue gas exhausted from the turbine 252 and the flue gas discharged from the heat exchanger 264 are combined to generate superheated steam of 3 atm and 660 K in the heat exchanger 262. The superheated steam expands through the steam turbine 268 to generate power. The final pressure and temperature of the steam from the turbine 268 are 0.1 atm and 330 K, respectively. This exhausted steam is condensed in the condenser 270 and then pumped to 3 bar and the condensate flows through the heat exchanger 260. The flue gas from the heat exchanger 262 flows through the heat exchanger 260.

In the foregoing preferred and alternative embodiments of the invention, the temperatures of the fluids entering and exiting heat exchange devices and condensers are provided. Further, the pressures of the fluids entering and exiting compressors, turbines and the like have been provided with their associated temperatures. These temperatures and pressures may vary plus or minus 20% from the stated figures and these ranges are within the scope of the invention. The specific process components, i.e. pumps, condensers, heat exchangers, etc., are well within the skill of the art and need not be described in detail.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A method for generating power which comprises:
   a) introducing steam, oxygen and coal into a reaction chamber;
   b) forming a fuel gas in the reaction chamber;
   c) flowing the fuel gas through a first heat exchanger;
   d) heating air flowing through the first heat exchanger;
   e) flowing a first portion of fuel gas through a second heat exchanger to a first compressor;
   f) flowing a second portion of fuel gas to a first turbine to produce power;
   g) flowing compressed fuel gas from the first compressor to a first combustor, flowing the air from the first heat exchanger to the first combustor;
   h) flowing combustion gases from the first combustor to a first gas turbine to drive the turbine to produce power;
   i) flowing the expanded fuel gas from the first turbine to a second combustor, and flowing the expanded gases from the first gas turbine to the second combustor;
   j) flowing the combusted gases from the second combustor to a second gas turbine to produce power;
   k) flowing water through a third heat exchanger to form steam, the steam flowing through the second heat exchanger and then to the reaction chamber;
   l) flowing condensate comprising the exhaust from a steam turbine through said third heat exchanger to convert the water flowing therethrough to the steam, the steam turbine producing power;
   m) flowing the air from a source through an air separation unit to produce the oxygen which formed oxygen flows through the third heat exchanger and into the second turbine the oxygen expanding through a second turbine, the expanded oxygen flowing into the reaction chamber.

2. The method of claim 1 which comprises:
   a) flowing the exhaust gases from the second gas turbine to a third combustor, flowing expanded fuel gas from the first turbine to the third combustor; and
   b) flowing the combusted gases from the third combustor into a third gas turbine to produce power, one portion of the exhaust from the third gas turbine flowing through the third heat exchanger and another portion of the exhaust flowing through a fourth heat exchanger upstream of the first heat exchanger to heat the air flowing to the first heat exchanger.

* * * * *